(12) United States Patent
Gentner et al.

(10) Patent No.: US 10,029,647 B2
(45) Date of Patent: Jul. 24, 2018

(54) SEATBELT RETRACTOR FOR A SEATBELT SYSTEM AND METHOD FOR INSTALLING A SEATBELT RETRACTOR

(75) Inventors: Bernd Gentner, Ellwangen/Pfahlheim (DE); Thomas Moedinger, Alfdorf (DE); Andreas Pregitzer, Ellenberg/Krassbronn (DE)

(73) Assignee: TRW AUTOMOTIVE GmbH (DE)

( * ) Notice: Subject to any disclaimer, the term of this patent is extended or adjusted under 35 U.S.C. 154(b) by 273 days.

(21) Appl. No.: 13/885,023

(22) PCT Filed: Oct. 20, 2011

(86) PCT No.: PCT/EP2011/005281
§ 371 (c)(1),
(2), (4) Date: Jun. 3, 2013

(87) PCT Pub. No.: WO2012/065672
PCT Pub. Date: May 24, 2012

(65) Prior Publication Data
US 2013/0327872 A1    Dec. 12, 2013

(30) Foreign Application Priority Data
Nov. 17, 2010 (DE) ........................ 10 2010 051 418

(51) Int. Cl.
*B60R 22/34* (2006.01)
*B60R 22/44* (2006.01)
*B60R 22/46* (2006.01)

(52) U.S. Cl.
CPC .............. *B60R 22/44* (2013.01); *B60R 22/34* (2013.01); *B60R 22/46* (2013.01);
(Continued)

(58) Field of Classification Search
CPC .......... B60R 22/34; B60R 22/44; B60R 22/46
(Continued)

(56) References Cited

U.S. PATENT DOCUMENTS 4,113,062 A * 9/1978 Beland ................ B60R 22/44
                                                              242/372
4,190,212 A * 2/1980 Cachia ................ B60R 22/44
                                                              242/372
(Continued)

FOREIGN PATENT DOCUMENTS

DE    2724622    12/1978
DE    4112620    5/1992
(Continued)

*Primary Examiner* — Sang K Kim
(74) *Attorney, Agent, or Firm* — Tarolli, Sundheim, Covell & Tummino LLP

(57) ABSTRACT

A belt retractor includes a retractor frame (10) having first and second end faces (10a, 10b) between which a belt reel (12) is pivoted. The belt retractor further includes a belt tensioner and a spring cassette (30) having a helical spring (26) coupled to the belt reel (12). The spring cassette (30) is arranged between the first end face (10a) of the retractor frame (10) and at least one component of the belt tensioner. A method of fitting such belt retractor includes mounting the spring cassette (30) on a component of the belt tensioner, especially on an inside of a tensioner casing (22) and mounting the belt tensioner including the spring cassette (30) on the retractor frame (10), especially on an end wall (10a) of the retractor frame (10). An alternative fitting method includes mounting the spring cassette (30) on an end wall (10a) of the retractor frame (10) and attaching the belt tensioner to the spring cassette (30) mounted on the end wall (10a) of the retractor frame (10).

22 Claims, 3 Drawing Sheets

(52) U.S. Cl.
CPC . *B60R 2022/3402* (2013.01); *B60R 2022/468* (2013.01); *B60R 2022/4657* (2013.01); *Y10T 29/49826* (2015.01)

(58) Field of Classification Search
USPC ........................................................ 242/374
See application file for complete search history.

(56) References Cited

U.S. PATENT DOCUMENTS

| | | | | |
|---|---|---|---|---|
| 4,546,934 A * | 10/1985 | Nishimura | .......... | B60R 22/4671 242/372 |
| 4,592,520 A * | 6/1986 | Kawaguchi | ......... | B60R 22/4671 242/372 |
| 4,620,677 A * | 11/1986 | Nagao | .................... | B60R 22/44 242/385 |
| 4,630,841 A * | 12/1986 | Nishimura | .............. | B60R 22/44 180/268 |
| 4,669,680 A * | 6/1987 | Nishimura | .............. | B60R 22/44 180/268 |
| 4,787,569 A * | 11/1988 | Kanada | .................. | B60R 22/44 242/371 |
| 5,131,594 A * | 7/1992 | Refior | ..................... | B60R 22/44 242/372 |
| 5,265,823 A * | 11/1993 | Doty | ....................... | B60R 22/44 242/372 |
| 5,489,072 A * | 2/1996 | Gordon et al. | ............... | 242/374 |
| 5,553,802 A * | 9/1996 | Park | ........................ | B60R 22/44 242/372 |
| 5,628,469 A | 5/1997 | Fohl | | |
| 5,865,391 A * | 2/1999 | Pleyer | .................... | B60R 22/44 242/375.3 |
| 6,311,918 B1 | 11/2001 | Specht | | |
| 6,371,397 B1 * | 4/2002 | Specht | .................... | B60R 22/44 242/375.1 |
| 6,409,217 B1 * | 6/2002 | Denis | .......................... | 280/806 |
| 6,419,176 B1 * | 7/2002 | Mizuno | ............... | B60R 22/4628 242/374 |
| 6,676,056 B2 * | 1/2004 | Peter | ....................... | B60R 22/44 242/374 |
| 6,851,716 B2 * | 2/2005 | Bullinger | ................ | B60R 22/44 242/374 |
| 7,506,832 B2 * | 3/2009 | Mori | ....................... | B60R 22/44 242/374 |
| 7,775,473 B2 * | 8/2010 | Mori | ....................... | B60R 22/46 242/374 |
| 2001/0022330 A1 * | 9/2001 | Mitsuo | .................... | B60R 22/44 242/372 |
| 2003/0038202 A1 | 2/2003 | Wier | | |
| 2006/0006269 A1 * | 1/2006 | Wier | ....................... | B60R 22/44 242/374 |
| 2008/0252060 A1 * | 10/2008 | Saito | ...................... | B60R 22/44 280/806 |
| 2009/0173816 A1 * | 7/2009 | Odate | ..................... | B60R 22/44 242/374 |

FOREIGN PATENT DOCUMENTS

| | | |
|---|---|---|
| DE | 19647842 | 5/1998 |
| DE | 19905703 | 9/2000 |
| EP | 0709266 | 5/1996 |
| EP | 1285827 | 2/2003 |
| WO | 2008/049562 | 5/2008 |

\* cited by examiner

SEATBELT RETRACTOR FOR A SEATBELT SYSTEM AND METHOD FOR INSTALLING A SEATBELT RETRACTOR

RELATED APPLICATIONS

This application corresponds to PCT/EP2011/005281, filed Oct. 20, 2011, which claims the benefit of German Application No. 10 2010 051 418.7, filed Nov. 17, 2010, the subject matter of which are incorporated herein by reference in their entirety.

BACKGROUND OF THE INVENTION

The invention relates to a belt retractor for a seat belt system comprising a belt tensioner and a spring cassette. The invention further relates to two alternative methods of fitting such belt retractor.

Belt retractors usually have a spring cassette including a helical spring that fulfills the functions of a close contact of the belt in the case of a belted vehicle occupant and of automatic belt webbing feed-in after the vehicle occupant has unfastened the seat belt. When the belt retractor also includes a belt tensioner, the spring cassette is usually outwardly attached, as a separate unit, to the belt tensioner which in turn is laterally disposed at the belt retractor. An example of such design is illustrated in EP 0 709 266 A1.

From EP 1 285 827 A1 a belt retractor comprising a retractor frame and a load limiter is known, the latter including an unlocking element to be actuated by a pyrotechnic actuator for releasing a locking pawl. The actuator is embedded in a casing disposed at the retractor frame. A spring cassette is integrally connected to this casing, in particular by an adhesive or by welding.

SUMMARY OF THE INVENTION

It is the object of the invention to optimize the arrangement of a spring cassette in a belt retractor including a belt tensioner.

This object is achieved by a belt retractor and methods comprising the features of the present invention. Advantageous and expedient configurations of the belt retractor according to the invention and the methods according to the invention are described herein.

The belt retractor according to the invention comprises a retractor frame having first and second end faces between which a belt reel is pivoted. The belt retractor further comprises a belt tensioner and a spring cassette having a helical spring coupled to the belt reel. The spring cassette is arranged between the first end face of the retractor frame and at least one component of the belt tensioner.

The invention is based on the finding that arranging the spring cassette between the retractor frame and the belt tensioner entails surprising advantages vis-à-vis the previously common arrangement on the outside of the belt tensioner. By arranging the spring cassette in accordance with the invention higher resistance in terms of safety is achieved in the drop test. Especially in combination with a pyrotechnically driven belt tensioner including a pinion driven by a load transmission element and being coupled to the belt reel, the structure according to the invention offers increased safety. Compared to the pressure gas generated upon activation of the pyrotechnic drive and acting on the surrounding units, the arrangement of the spring cassette according to the invention exhibits higher strength. This applies in particular when e.g. the pinion of the belt system is locked and excessive pressure is built up. Also the noise development is reduced in the belt retractor according to the invention, especially during tensioning and webbing feed-in. Moreover, the structure according to the invention has the advantage that the pressure gas and entrained particles as well as other residues are not discarded into the interior of the vehicle or into the car body but are discharged in the belt tensioner in a well-defined manner.

According to the preferred embodiment of the invention, the spring cassette is substantially completely enclosed by a tensioner casing so that a compact design is resulting in which the spring cassette is arranged between the retractor frame and the tensioner casing. The tensioner casing offers additional protection against external influences to the helical spring.

As regards fitting of the belt retractor, a design is of advantage in which the spring cassette is attached at the inside of the tensioner casing. The belt tensioner in this case can form a pre-assembled unit together with the belt retractor, thereby considerably facilitating the assembly of the belt retractor. In particular, by arranging the spring cassette at the tensioner casing a correct positioning of the spring cassette relative to the belt tensioner components is ensured.

Thus it is sufficient for fitting the complete unit of "belt tensioner and spring cassette" to mount the tensioner casing on the first end face of the retractor frame. A separate mounting or positioning of the spring cassette is not necessary.

However, also an alternative fitting is possible in which the retractor frame and the spring cassette are pre-assembled before the belt tensioner is attached to the spring cassette and is disposed at the retractor frame. Accordingly, in this case the spring cassette is mounted on the retractor frame, especially at the first end face thereof.

In accordance with a further development of the invention, the spring cassette additionally has a guiding portion for a load transmission element of the belt tensioner. Due to this extended functionality of the spring cassette additional measures for guiding the load transmission element can be dispensed with.

Preferably the guiding portion is connected to a stop disk which results in a very compact design including few components.

In an advantageous configuration between the retractor frame and the tensioner casing a filter arrangement located directly adjacent to the discharge orifice of the tensioner tube can be provided. This filter arrangement can be fixed during assembly via the stop disk, for instance. The filter arrangement can be, for example, a wire mesh or knitted filtering fabric known per se. However, also other filtering materials suited for this application can be used.

The filtering function can also be integrated directly in the tensioner casing which for this purpose is connected to the retractor casing in a substantially sealing manner and at an appropriate location includes a discharge orifice having a filter insert.

The invention also provides a method of fitting a belt retractor according to the invention, the method comprising the steps of:

mounting the spring cassette on a component of the belt tensioner, especially at an inside of a tensioner casing; and mounting the belt tensioner with the spring cassette on the retractor frame, especially at an end wall of the retractor frame.

An alternative fitting method according to the invention comprises the steps of:

mounting the spring cassette on an end wall of the retractor frame; and attaching the belt tensioner onto the spring cassette mounted on the end wall of the retractor frame.

According to the preferred embodiment of the alternative fitting method, the belt tensioner including a tensioner casing is mounted on the end wall of the retractor frame so that the spring cassette is enclosed substantially completely by the tensioner casing.

BRIEF DESCRIPTION OF THE DRAWINGS

Further features and advantages of the invention are evident from the following description and from the attached drawings that are referred to. The drawings show in.

DESCRIPTION

Figure 1:
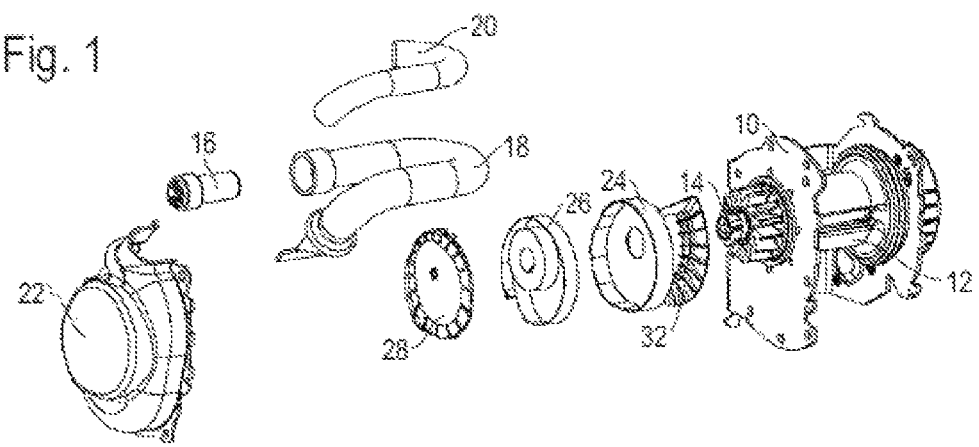
FIG. 1 an exploded view of a belt retractor according to the invention.
Figure 2:
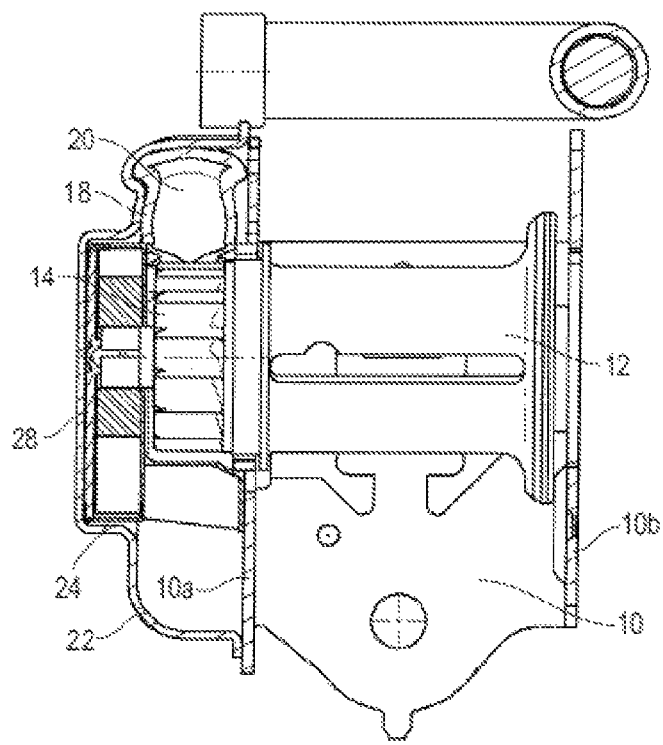
FIG. 2 a sectional view of the assembled belt retractor.

In FIG. 1 the substantial components of a belt retractor including a pyrotechnically driven belt tensioner are shown. FIG. 2 shows the belt retractor in the assembled state.

A belt reel 12 onto which webbing can be retracted and from which webbing can be unwound is pivoted in a retractor frame 10. A pinion 14 coupled to the belt reel 12 is pivoted on the retractor frame 10.

The belt tensioner of the belt retractor includes a pyrotechnic drive unit having an igniter 16 as well as a load transmission element 20 movably arranged in a tensioner tube 18. The components of the belt tensioner are enclosed at least partly by a tensioner casing 22 mounted on the retractor frame 10.

Figure 3:
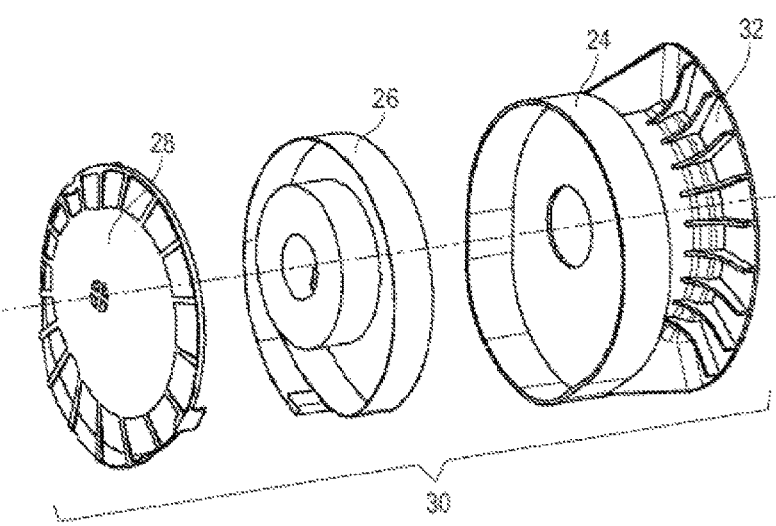
FIG. 3 an exploded view of the spring cassette of the belt retractor.

Furthermore a stop disk 24, a helical spring 26 disposed therein and coupled to the pinion 14 and to the belt reel 12, respectively, and a cover 28 are attached to the pinion 14. These components shown separately in FIG. 3 together constitute a spring cassette 30 of the belt retractor. A guiding portion 32, which will be discussed later, is integrally connected to the stop disk 24.

As is especially evident from FIG. 2, the belt reel 12 is supported between two end faces 10a, 10b of the retractor frame 10. The pinion 14 coupled to the belt reel 12 projects from the first end face 10a. Equally on the first side 10a the spring cassette 30 and the belt tensioner are arranged (apart from components of the tensioner tube 18 and of the load transmission means 20 provided therein which extend to the second side 10b of the retractor frame 10). The spring cassette 30 is mounted between the first end face 10a of the retractor frame and a component of the belt tensioner, more exactly speaking the tensioner casing 22.

Figure 4:
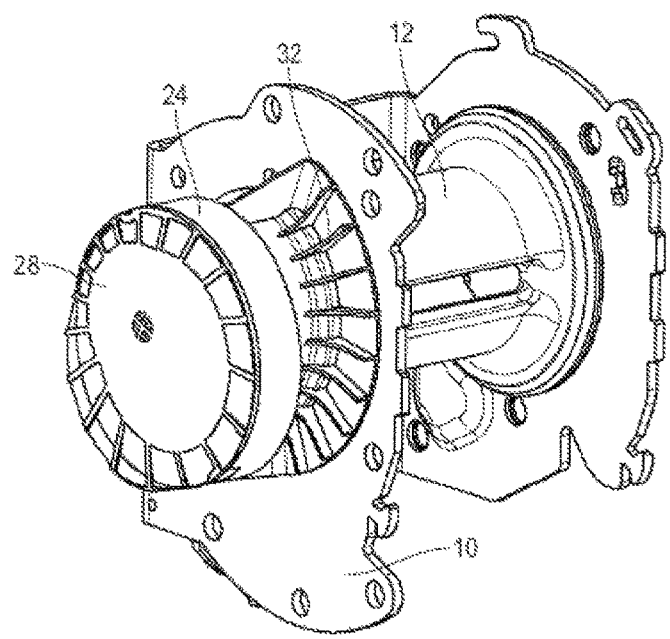
FIG. 4 a perspective view of the belt retractor without belt tensioner.
Figure 5:
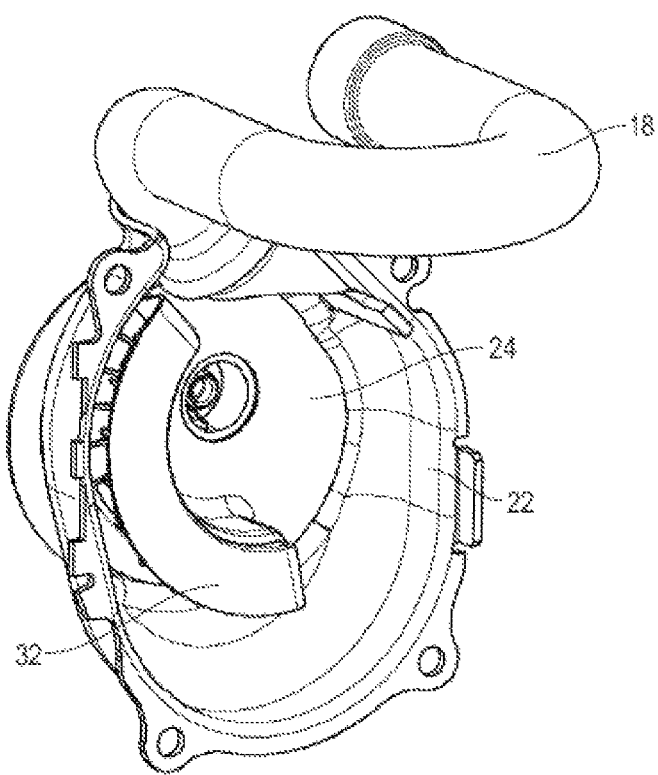
FIG. 5 a perspective view of the belt tensioner and the spring cassette of the belt retractor.

Especially emphasized are the modular structure of the belt retractor and the concrete arrangement of the "spring cassette" 30 and "belt tensioner" modules which can be pre-assembled as units. FIGS. 4 and 5 illustrate two options as to how the belt retractor can be assembled.

According to FIG. 4, at first the spring cassette 30 is mounted on the first end face 10a of the retractor frame 10. After that, the belt tensioner is attached to the spring cassette and is equally mounted on the first end face 10a of the retractor frame 10.

According to FIG. 5, on the other hand, the spring cassette 30 is first mounted on the belt tensioner, more exactly speaking on the inside of the tensioner casing 22. The "belt tensioner and spring cassette" unit is then disposed at the first end face 10a of the retractor frame 10 by disposing the tensioner casing 22 with the components of the belt tensioner and the spring cassette 30 arranged therein at the first end face 10a of the retractor frame 10 by mounting the tensioner casing 22 on the end face 10a.

The components of the spring cassette 30 basically can be mounted on the retractor frame 10 or on the belt tensioner also in a conventional manner, i.e. not as a pre-assembled unit.

Upon tensioning—in the case of normal as well as faulty function (especially when the pinion is locked)—the load transmission element 20 is additionally guided by means of the guiding portion 32 connected to the stop disk 24. Basically this guiding of the load transmission element 20 can also be taken over by the tensioner casing 22 or by the retractor frame 10.

The invention claimed is:

1. A belt retractor for a seat belt system comprising:
a retractor frame (10) including first and second end faces (10a, 10b) between which a belt reel (12) is pivoted,
a belt tensioner arranged to cause webbing to be wound onto the belt reel, the belt tensioner including an igniter and a load transmission element, the igniter moving the load transmission element to drive a pinion coupled to the belt reel to wind webbing onto the belt reel, and
a spring cassette (30) including a helical spring (26) coupled to the belt reel (12) and arranged to cause webbing to be wound onto the belt reel, the first end face being arranged between the spring cassette and the belt reel,
wherein the spring cassette (30) is arranged between the first end face (10a) of the retractor frame (10) and at least one component of the belt tensioner.

2. The belt retractor according to claim 1, wherein the spring cassette (30) is enclosed substantially completely by a tensioner casing (22).

3. The belt retractor according to claim 2, wherein the spring cassette (30) is mounted on the inside of the tensioner casing (22).

4. The belt retractor according to claim 2 wherein the tensioner casing (22) is mounted on the first end face (10a) of the retractor frame (10).

5. The belt retractor according to claim 1, wherein the spring cassette (30) is mounted on the retractor frame (10).

6. The belt retractor according to claim 5, wherein the spring cassette is mounted on the first end face of the retractor frame.

7. A method of fitting a belt retractor according to claim 1, comprising the steps of:
mounting the spring cassette (30) on the belt tensioner; and
mounting the belt tensioner including the spring cassette (30) on the retractor frame (10).

8. The method of fitting a belt retractor according to claim 7, wherein the step of mounting the spring cassette includes mounting the spring cassette on an inside of a tensioner casing.

9. The method of fitting a belt retractor according to claim 7, wherein the step of mounting the belt tensioner including the spring cassette includes mounting the belt tensioner including the spring cassette on the first end face of the retractor frame.

10. A method of fitting a belt retractor according to claim 1, comprising the steps of:
   mounting the spring cassette (30) on the first end face (10a) of the retractor frame (10); and
   attaching the belt tensioner to the spring cassette (30) mounted on the first end face (10a) of the retractor frame (10).

11. The method according to claim 10, wherein the belt tensioner including a tensioner casing (22) is mounted on the first end face (10a) of the retractor frame (10) so that the spring cassette (30) is enclosed substantially completely by the tensioner casing (22).

12. A belt retractor according to claim 1, wherein the spring cassette is arranged between the first end face of the retractor frame and the at least one component of the belt tensioner in a direction extending along a longitudinal axis of the belt reel.

13. The belt retractor according to claim 1, wherein the spring cassette is axially arranged between the first end face of the retractor frame and the at least one component of the belt tensioner.

14. A belt retractor for a seat belt system comprising:
   a retractor frame (10) including first and second end faces (10a, 10b) between which a belt reel (12) is pivoted,
   a belt tensioner arranged to cause webbing to be wound onto the belt reel, and
   a spring cassette (30) including a helical spring (26) coupled to the belt reel (12) and arranged to cause webbing to be wound onto the belt reel, the spring cassette (30) including a guiding portion (32) for a load transmission element (20) of the belt tensioner, the first end face being arranged between the spring cassette and the belt reel,
   wherein the spring cassette (30) is arranged between the first end face (10a) of the retractor frame (10) and at least one component of the belt tensioner.

15. The belt retractor according to claim 14, wherein the guiding portion (32) is connected to a stop disk (24).

16. The belt retractor according to claim 14, wherein the spring cassette (30) is enclosed substantially completely by a tensioner casing (22).

17. A method of fitting a belt retractor according to claim 14, comprising the steps of:
   mounting the spring cassette (30) on the belt tensioner; and
   mounting the belt tensioner including the spring cassette (30) on the retractor frame (10).

18. A method of fitting a belt retractor according to claim 14, comprising the steps of:
   mounting the spring cassette (30) on the first end face (10a) of the retractor frame (10); and
   attaching the belt tensioner to the spring cassette (30) mounted on the first end face (10a) of the retractor frame (10).

19. A belt retractor for a seat belt system comprising:
   a retractor frame (10) including first and second end faces (10a, 10b) between which a belt reel (12) is pivoted,
   a belt tensioner arranged to cause webbing to be wound onto the belt reel, and
   a spring cassette (30) including a helical spring (26) coupled to the belt reel (12) and arranged to cause webbing to be wound onto the belt reel, the spring cassette further including a stop disk and a cover attached thereto, the helical spring being disposed inside the stop disk, the first end face being arranged between the spring cassette and the belt reel,
   wherein the spring cassette (30) is arranged between the first end face (10a) of the retractor frame (10) and at least one component of the belt tensioner.

20. The belt retractor according to claim 19, wherein the spring cassette (30) is enclosed substantially completely by a tensioner casing (22).

21. A method of fitting a belt retractor according to claim 19, comprising the steps of:
   mounting the spring cassette (30) on the belt tensioner; and
   mounting the belt tensioner including the spring cassette (30) on the retractor frame (10).

22. A method of fitting a belt retractor according to claim 19, comprising the steps of:
   mounting the spring cassette (30) on the first end face (10a) of the retractor frame (10); and
   attaching the belt tensioner to the spring cassette (30) mounted on the first end face (10a) of the retractor frame (10).

\* \* \* \* \*